Feb. 6, 1940.  C. W. RYERSON  2,189,182
TIRE COVER
Filed Dec. 31, 1931  5 Sheets-Sheet 1
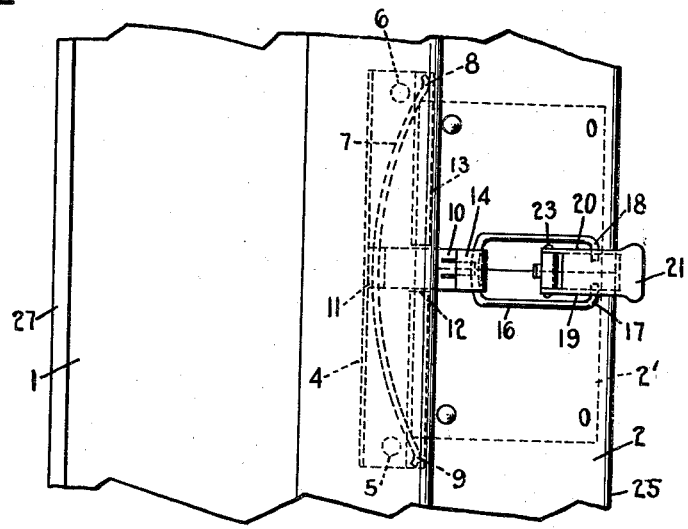
INVENTOR
Creighton W. Ryerson
BY Ira J. Adams
ATTORNEY Feb. 6, 1940.    C. W. RYERSON    2,189,182
TIRE COVER
Filed Dec. 31, 1931    5 Sheets-Sheet 2
FIG. 3
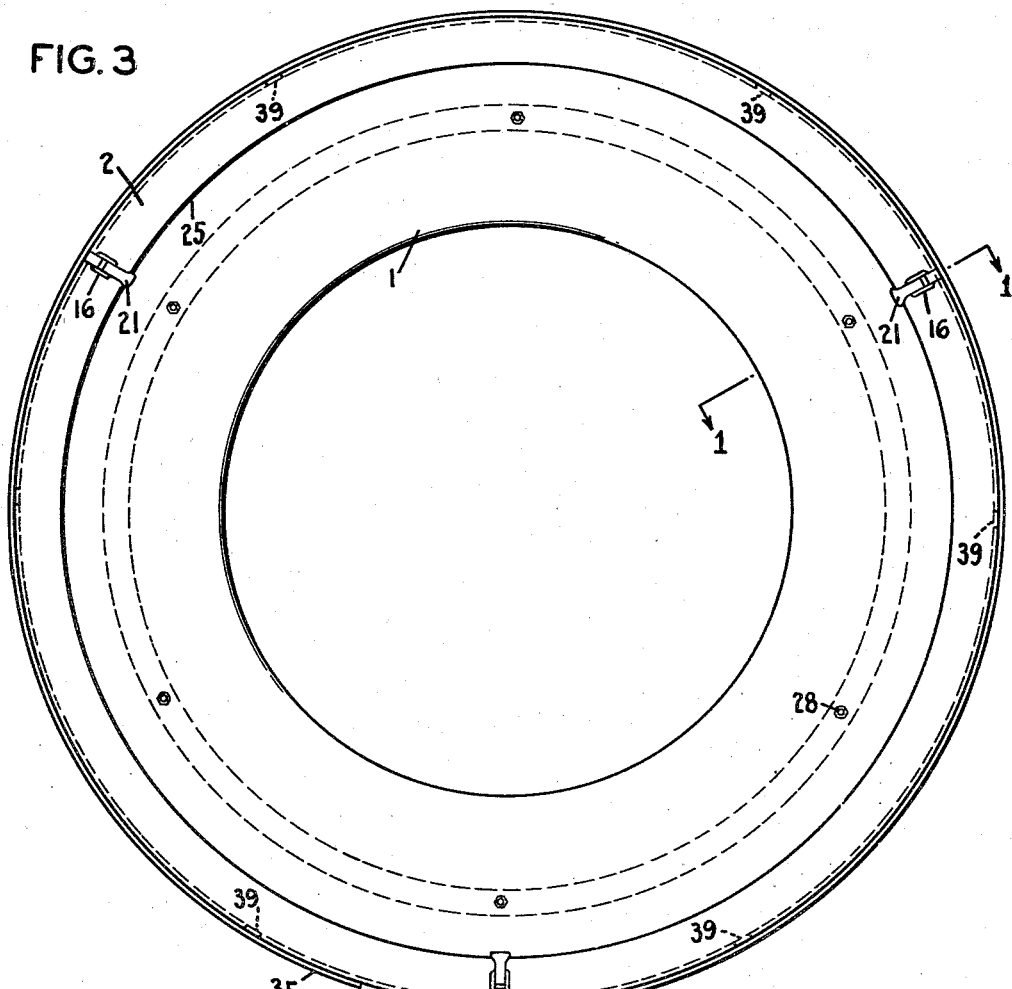
FIG. 4
FIG. 16
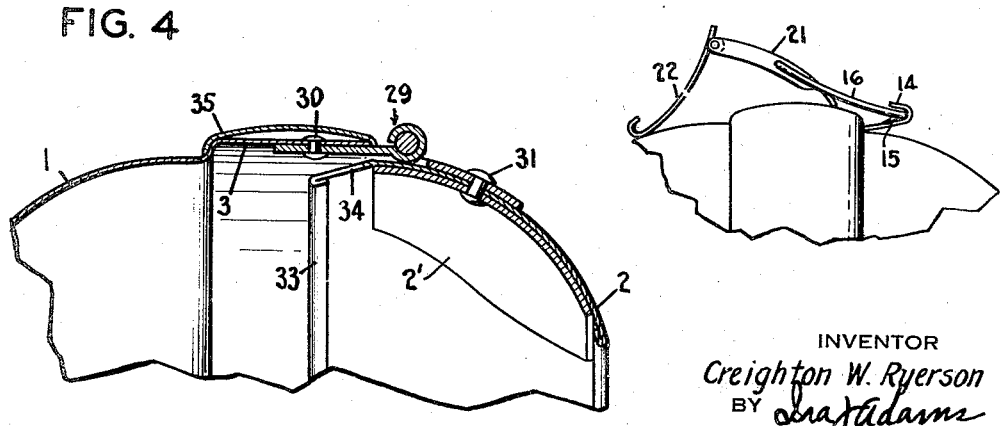
INVENTOR
Creighton W. Ryerson
BY Ira J. Adams
ATTORNEY Feb. 6, 1940.                    C. W. RYERSON                    2,189,182
                                   TIRE COVER
                              Filed Dec. 31, 1931            5 Sheets-Sheet 3
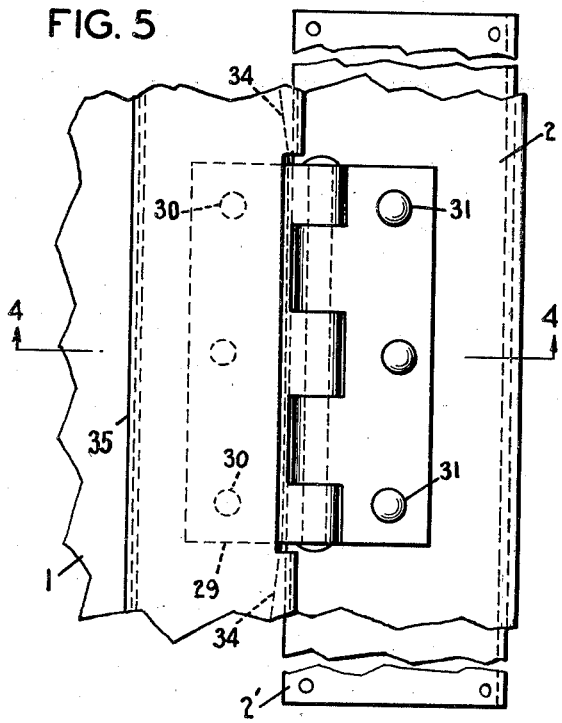
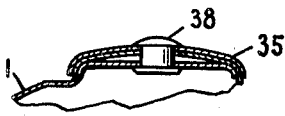
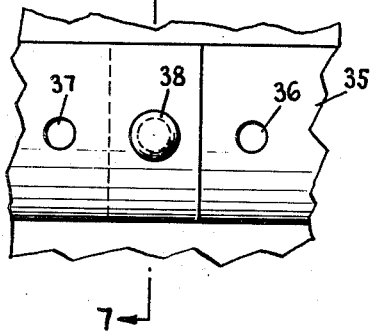
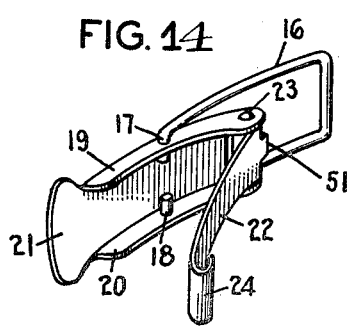
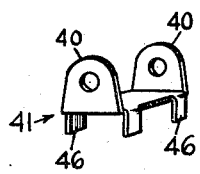
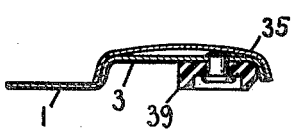
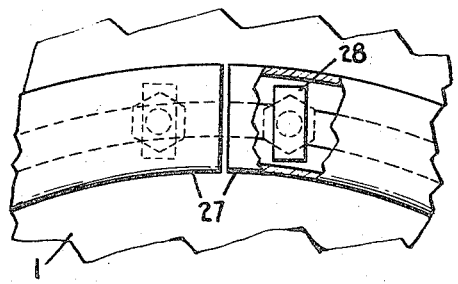
INVENTOR
Creighton W. Ryerson
BY
ATTORNEY INVENTOR
Creighton W. Ryerson
BY Ira J Adams
ATTORNEY Feb. 6, 1940.   C. W. RYERSON   2,189,182
TIRE COVER
Filed Dec. 31, 1931   5 Sheets-Sheet 5

INVENTOR
Creighton W. Ryerson
BY
ATTORNEY

Patented Feb. 6, 1940

2,189,182

UNITED STATES PATENT OFFICE 2,189,182

TIRE COVER

Creighton W. Ryerson, Jackson, Mich., assignor to Ryerson & Haynes Inc., a corporation of Michigan Application December 31, 1931, Serial No. 584,030

3 Claims. (Cl. 150—54)

This invention relates to tire covers.

An object of the invention is to produce a metal tire cover of two parts, divided circumferentially of the tire, with automatically adjustable means for releasingly clamping the two parts together.

Another object of the invention is to produce a two part tire with resilient latching means to hold the parts together but which may at once be unlatched to entirely separate the two parts.

Another object of the invention is to produce the above mentioned resilient latching means with a hidden spring and more particularly a spring housed under the cover.

A still further object is to produce a two part cover for tires in which the latches will remain in open adjusted position where they are out of the way when the two parts are telescoped around a tire after which they may be moved into latching position.

A further object is to so construct a separable cover with latches on one part that will fasten to the other part without individual keepers so that the two parts can be fastened together without indexing or specially positioning the one part in respect to the latches on the other part.

Another object is to eliminate special keepers for the latch hooks on one part of the cover and engage the latter directly with any portion of the inside edge of the other part.

Another object is to devise special latches to secure the results above mentioned.

Another object is to provide a two piece tire protector or cover in which the back plate is narrow enough to permit its being rolled from strip stock instead of stamped from plate material.

Other objects of the invention will appear in the following description, reference being had to the drawings, in which:

Fig. 1 is a section of a tire cover taken on the line 1—1 of Fig. 3.

Fig. 2 is a plan view of the latch and a portion of the cover shown in Fig. 1.

Fig. 3 is an elevation of the complete tire cover.

Fig. 4 is a partial section of the hinge taken along the line 4—4 of Fig. 5, the molding being removed to better show the parts.

Fig. 5 is a plan view of the hinge of Fig. 4 with a portion of the cover.

Fig. 6 is a plan view of a section of a portion of the perimeter of the cover showing the method of attaching the molding.

Fig. 7 is a section taken on the line 7—7 of Fig. 6.

Fig. 9 is a perspective view of the latch bracket shown in Fig. 8.

Fig. 13 is a fractional elevation showing the method of connecting the ends of the side molding.

Fig. 14 is a perspective view of the latch mechanism of Fig. 1.

Fig. 15 is a view of the buffer pads.

Fig. 16 is a fragmentary view showing the latch in open position.

Figure 10:
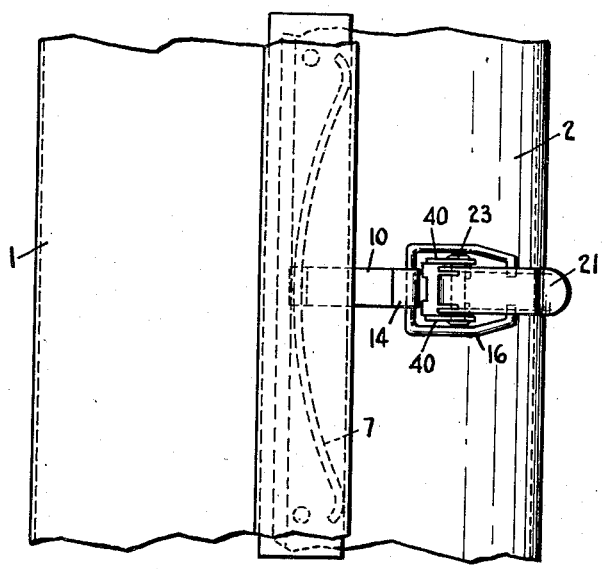
Fig. 10 is a plan of the latch shown in Fig. 8 and the associated part of the cover.

Referring to the drawings, the tire cover in this case is made of sheet metal, preferably steel, and consists of two toroidal parts each being concave on the inside. When the cover is applied the hollow portions of the covers face each other so as to enclose the tire. In Fig. 1 the trough shaped ring 1 is proportioned to extend from slightly beyond the center plane of the tire at the top over the front face of the tire and preferably extending below the flange of the rim on which the tire is mounted, though of course this is not a requirement. The idea of the design is to cover the front portion of the tire so that when the tire and cover are in place on the car the part will be on the outside and the tire will not be visible. The second ring 2 is preferably proportioned so that it telescopes with the ring cover 1 and extends part way downward on the rear side thereof, that is, the side next to the automobile on which the tire and cover are mounted.

The trough shaped ring 1 is stamped from a single piece of steel plate but the back ring 2 is rolled from strip stock, the ends of which are butt-jointed and a back plate 2' spot-welded, riveted or otherwise fastened thereto. This rolling operation materially reduces the cost without detracting from the usefulness of the cover. The ring 1 has a circumferential depression or trough 3 forming in effect a wide bead in the median plane of the tire. A plate 4 shaped as clearly shown in Fig. 1 is riveted at 5 and 6 in the depression 3 of the bead. Inside this housing is placed a spring member which may be a wire bow or arc of spring material having slightly upturned ends 8 and 9. A link 10 has one end turned over at 11 so as to surround the center part of the bow spring 7. The body of the link extends through a slot 12 cut in the turned over end 13 of the housing. The other end of the link 10 is bent in hook shape at 14 to form a snap fastener over the bail 16. The bail or loop may be snapped into the link 10 by a longitudinal pull, whereupon the hook 14 in conjunction with the tongue 15 struck up from strip 10 moves to let the loop enter the hook. This enables one to snap the loop into place, after which the parts will spring into the position shown in Fig. 1 to frictionally hold the bail in place. This bail is therefore fastened in the link 10 but it may be readily removed by springing the hook away from the end of the tongue sufficiently to permit the bail to clear the end of the tongue. The bail 16 has turned over ends 17 and 18 extending through sides 19 and 20 of the latch handle 21. The handle has a wide finger piece on which the bail rests to hold it in retracted position, the bail being held in this position by the tongue 15. At the rear of the latch a catch 22 is pivoted between the sides 19 and 20 by a pin 23. The catch 22 has a hook 24 (Fig. 14) adapted to extend over the inner edge 25 of the rim 2. This inner edge 25 as well as the edge 26 of the ring 1 are preferably bent back as shown to form a rounded edge. The catch has a stop lug 51 to engage the back end of handle 21 so that the catch never can rotate more than substantially 180 degrees. It is an important feature that no keepers are required for the latches and the two ring covers need not be adjusted or indexed to bring a keeper opposite a latch. The two covers may be latched in any position since the catches engage any portion of the inside edge 25.

The ring 1 may have a circular side molding 27 held thereon by a plurality of bolts 28, say eight in number, so as to decorate the front face of the tire cover. This molding may be painted a different color from the ring 1 but preferably it is either chromium plated or made of stainless steel and polished. The rest of the side of the ring 1 is usually painted or enameled. This is for a pleasing effect, however, and the painting, enameling, plating or polishing may be arranged as desired. The bolts 28 preferably have a T-shaped head so that they can be inserted between the edges of the side molding 27 by positioning the long part of the head parallel to the slot between the sides, then by turning the bolt 90° it is in position to clamp the sides and thus fasten the molding to the ring 1. The bolts may be held in position by nuts and lock washers or by any other suitable fastener.

The front ring 1 in the preferred form is entirely separate from the back ring 2 and a plurality of the fasteners are located around the circumference at spaced intervals to hold the two rings together. Three latches will ordinarily be employed.

It is an advantage to have the two ring covers entirely separate from each other as it facilitates handling of the empty cover and the application of the same to the tire. To apply the cover the latches are thrown back into the position shown in Fig. 16. The link 10 springs up slightly (exaggerated for illustrative purposes in Fig. 1) when the latches are released. The spring tongues 15 frictionally bear against the loops 16 and hold them in this retracted position until they are again moved into latching position by the operator.

To apply the tire the back ring is laid down with the concave surface up. The tire is placed in this ring. The cover ring 1 is then placed on top of the tire, the latches being in retracted position, as above described, they do not interfere with this operation. Each latch is then moved downward until the hook 24 engages the edge 25. During this operation the handle 21 is in the unlatched position. After the hook 24 is in engagement with the edge 25 the handle 21 is moved clockwise (in Fig. 1) and this pulls down on the loop 16 and up on the hook 24, thus compressing the spring 7 and drawing the two ring covers against the sides of the tire where they are resiliently held by the springs 7. In performing this operation, as will be apparent, the operator did not have to take any pains to rotate the cover 1 around the tire so that the latch would be opposite a keeper. He merely placed it on the tire and the latch hooks were moved into engagement with the inner edge 25. This is an important and useful feature.

In the foregoing operation it will be noted that the front ring cover 1 is not laid on the ground and does not become scratched or marred. The edge 25 of the back ring takes the strain in this respect. This lower edge is practically invisible when the cover is on the tire and therefore my tire cover is capable of being readily applied without marring of any visible part in the inserting or removing operation.

Tires, even of the same nominal size, vary to a considerable extent and the spring action of the latches ensures that the tire is always tightly held at the sides. It therefore cannot rattle.

The design of this cover is such that it is of universal use. It will fit into the fender well of any automobile either on the right or the left side and likewise may be used with equal facility on the spare tire supported in the rear in which position the entire tread as well as the front and part of the rear side, is protected. In some instances customers prefer that the ring 2 be hinged to the ring 1 and for this particular trade I use hinge 29, (Figs. 4 and 5) having one side riveted at 30 to the ring 1 and the other side riveted at 31 to the ring 2. To permit ready telescoping or meshing of the ring 2 inside of ring 1 either in hinged form or in the other forms it is preferable to roll the ring so that a slight cone effect is produced, as clearly shown in Fig. 4. The outer edge 33 of the ring 2 is bent back as shown. When the two parts are hinged together the outer edge is cut away at 34 adjacent the hinge so that it will not interfere with part of the hinge 29 that is riveted to the ring 1 when the cover is in closed position.

The back plate 2' in this modification may be made considerably larger than in the other models so as to reinforce the cover in the neighborhood of the hinge. A reinforcing plate may likewise be used on the plate 1 at this point to strengthen the cover adjacent the hinge. The molding 35, however, will usually furnish rigidity at this point as well as other points on the cover 1.

To further decorate the tire cover I prefer to apply a circular molding 35 over the annular bead 3, as shown in Fig. 1. This bead may be painted, enameled, or plated in any way, but when the rest of the cover is painted or enameled it gives a more pleasing appearance to plate or polish the molding. I prefer to make it of stainless steel which will take a lasting polish. The method of fastening the top molding is shown in Figs. 6 and 7. Two holes 36, 37, are formed adjacent the ends of the molding, which is an open ring, and after the molding is placed in position over the bead 3 the prongs of an appropriate tool are inserted in these holes and the holding bracket tightly drawn around the bead.

The molding is so designed that when it is tightened in position there will be a slight overlap between the ends, as shown in Fig. 6. The parts are then riveted by rivet 38 which passes through holes in the ends of the molding and a hole in the bead portion 3.

To prevent rattling it is preferable to use pads 39 of semi-hard material riveted inside the bead 3 with countersunk rivet. These pads may be spaced around the cover in the peripheral trough in any desired number but ordinarily six are preferable. They are preferably made of rubber.

To apply the cover the latches, preferably two in number, are unfastened and moved into retracted position. The cover is then opened up about the hinges. A tire is inserted in position between the covers and they are then brought together by pivoting around the hinge until the ring 2 is partially telescoped within the ring 1. The latches are fastened in the way previously described.

Figure 8:
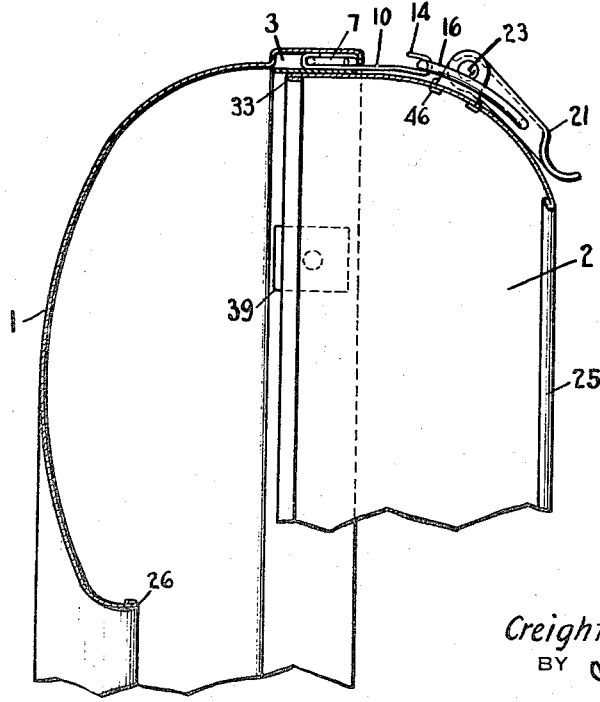
Fig. 8 is a partial section of the cover with a modified form of latching means.

In Fig. 8 I have shown a modification wherein substantially similar parts have been given similar reference characters. This modification differs from the one previously described by pivoting the latch handle to ears 40 of a bracket 41 by pin 23. This bracket is fastened to the cover ring 2 by turned-over lugs 46 or by other means.

In Fig. 9 the prongs 46 are shown in position to be inserted through the slots after which they are turned over to clamp the bracket in place on the cover. In this form the bail 16 is not permanently held in the hook end of the link 10. The hook 14 in this instance does not have the tongue 15 of Fig. 1 so that the bail can be readily inserted and removed from the hook.

The beveled or cone shaped rim may likewise be used but as a variation I have shown the edge 33 substantially straight. When this edge is straight, as thus shown, the parts will be proportioned so that the ring 2 will readily telescope into the ring 1.

The latches are turned clockwise in Fig. 8 so the bail enters the hook 14. Further pressure on the handle 21 then draws on the link 10 and forces the two rings together around the tire, as previously described. Any number of these latches may be used but it is preferable to use at least three but if a hinged ring is desired two will be sufficient.

While I may use top and side moldings in the modification of Fig. 8, as in Fig. 1, I have not shown these as they may or may not be used, as desired.

Figure 12:
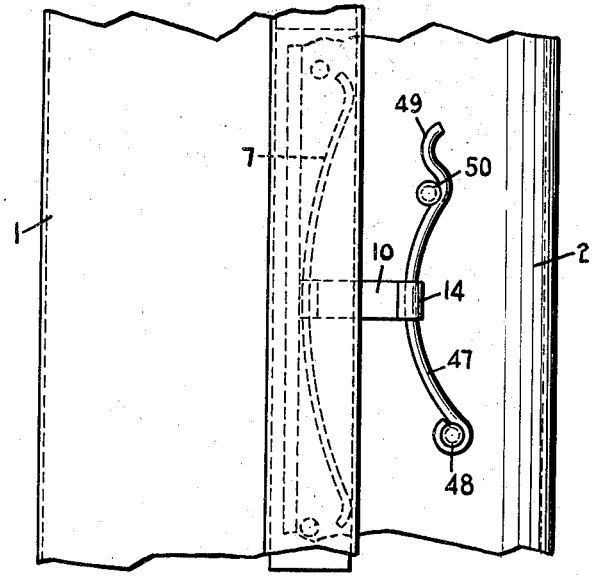
Fig. 12 is a plan view of the latch of Fig. 11 with a portion of the cover.
Figure 11:
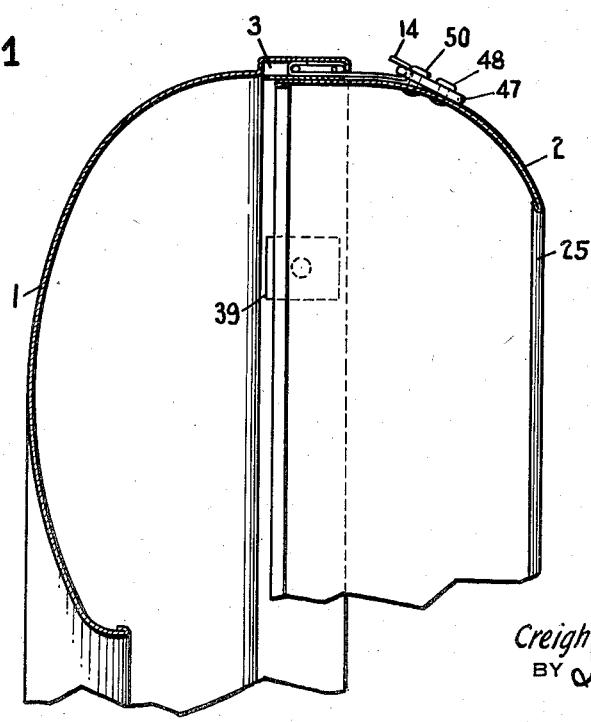
Fig. 11 is a sectional elevation of a modified form of latch with a portion of the cover.

In Figs. 11 and 12 I have shown a still further modified form of latching means. In this modification substantially similar parts have similar reference characters. The handle 47 in this modification is pivoted to the ring 2 at 48. To latch the cover in position around the tire (not shown) the two rings will be telescoped with the tire inside and this handle 47 would be rotated clockwise in Fig. 12 about the pivot point 48 until the handle 47 enters the hook 14. Pressure on the finger piece 49 will force the two rings together and compress the spring 7 after which the handle will be snapped over the headed rivet 50. The two parts will then be held together by spring tension as in the other modifications. The handle 47 is made from wire and it may be made somewhat longer and of spring stock so that it will flex and furnish the resiliency. In such case the spring 10 may be omitted and the hook 14 riveted directly to the cover ring 1.

In this third modified form the two rings 1 and 2 are preferably separate and held together only by the catches spaced around the cover rings but they may be hinged together as in Fig. 3, if desired.

I have described a number of modified forms for securing the advantages of my improved form of cover but it will be apparent that this is by way of example only and various modifications may be used without departing from the spirit of the invention.

Having described my invention, what I claim is:

1. A tire cover for the space tire and wheel assembly of automotive vehicles, comprising two freely telescoping cover parts being so arranged as to nest within each other to a greater extent than ever possible when installed on a tire, one of said parts constituting a back band and extending over a portion of the tread and rear side wall of the tire, the other of said parts extending over the remaining portion of the tread and the front side wall of the tire, said parts conforming substantially to the contour of the tire covered thereby, said parts being so arranged that when in position they directly engage the tire and are solely spaced by the tire, releasable latch mechanism for clamping said parts upon the tire, said mechanism including an extensible and contractible link, and yieldable means connected to one of said parts to which said link is fastened, said means being arranged to compensate for variations in tire sizes within predetermined limits.

2. A tire cover as defined in claim 1, in which said resilient means takes the form of a bowed spring extending circumferentially of and disposed under the outer edge of said part covering the tread and front side wall of the tire.

3. A tire cover as set forth in claim 1, wherein said extensible and contractible link has fixed extended and contracted positions.

CREIGHTON W. RYERSON.